United States Patent
Butcka

(10) Patent No.: US 10,828,584 B2
(45) Date of Patent: Nov. 10, 2020

(54) FUEL FILTER ELEMENT ELECTRICAL GROUNDING

(71) Applicant: Hamilton Sundstrand Corporation, Charlotte, CT (US)

(72) Inventor: William W. Butcka, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 25 days.

(21) Appl. No.: 16/189,082

(22) Filed: Nov. 13, 2018

(65) Prior Publication Data

US 2020/0149501 A1    May 14, 2020

(51) Int. Cl.
*B01D 35/00* (2006.01)
*F02M 37/32* (2019.01)

(52) U.S. Cl.
CPC ...... *B01D 35/005* (2013.01); *B01D 2201/291* (2013.01); *B01D 2201/293* (2013.01); *B01D 2201/295* (2013.01); *B01D 2201/298* (2013.01); *B01D 2201/305* (2013.01); *B01D 2201/50* (2013.01); *F02M 37/32* (2019.01)

(58) Field of Classification Search
CPC ........ B01D 2201/291; B01D 2201/293; B01D 2201/295; B01D 2201/298; B01D 2201/305
See application file for complete search history.

(56) References Cited

U.S. PATENT DOCUMENTS

| | | | | |
|---|---|---|---|---|
| 6,613,227 B2* | 9/2003 | Rickle | ............... | B01D 35/0273 |
| | | | | 210/243 |
| 6,740,236 B2* | 5/2004 | Rickle | .................. | B01D 29/21 |
| | | | | 210/243 |
| 7,140,247 B2* | 11/2006 | Forgue | .................. | B01D 35/26 |
| | | | | 73/313 |
| 7,438,736 B1* | 10/2008 | Grey | .................. | B01D 46/0093 |
| | | | | 55/341.2 |
| 7,467,549 B2* | 12/2008 | Forgue | .................. | B01D 35/26 |
| | | | | 123/509 |
| 7,527,042 B2* | 5/2009 | Crary | ..................... | F02M 37/50 |
| | | | | 123/509 |
| 7,793,539 B2* | 9/2010 | Forgue | ................ | F02M 37/106 |
| | | | | 73/313 |
| 8,182,682 B1* | 5/2012 | Rajadhyaksha | ........ | F02M 27/04 |
| | | | | 210/243 |
| 8,431,023 B2* | 4/2013 | Berland | ................ | B01D 35/26 |
| | | | | 210/243 |
| 8,715,497 B2* | 5/2014 | Schnipke | ........... | B01D 35/0273 |
| | | | | 210/172.2 |
| 8,932,464 B2 | 1/2015 | Byrd et al. | | |

(Continued)

FOREIGN PATENT DOCUMENTS

CN          103423047 A      12/2013

OTHER PUBLICATIONS

Extended European Search Report dated Mar. 13, 2020, received for corresponding European Application No. 19207119.9, 13 pages.

*Primary Examiner* — Kevin R Steckbauer
(74) *Attorney, Agent, or Firm* — Kinney & Lange, P.A.

(57) ABSTRACT

An end cap for a fuel filter includes a metal body with a first surface opposite a second surface. A hole extends through the first surface and the second surface of the body. A metal spring is connected to the first surface of the metal body and extends at least partially over the hole.

20 Claims, 4 Drawing Sheets

(56) References Cited

U.S. PATENT DOCUMENTS

| | | | |
|---|---|---|---|
| 2003/0057146 A1* | 3/2003 | Rickle | B01D 35/147 210/243 |
| 2003/0132156 A1* | 7/2003 | Rickle | B01D 35/0273 210/416.4 |
| 2010/0025318 A1* | 2/2010 | Berland | B01D 35/26 210/243 |
| 2019/0242342 A1* | 8/2019 | Huang | F02M 37/46 |

* cited by examiner

FUEL FILTER ELEMENT ELECTRICAL GROUNDING

BACKGROUND

The present disclosure relates to fuel filters, and more specifically to the electrical grounding of fuel filters.

Engines, including aircraft engines, use fuel filters to remove particulates from liquid fuel. As the liquid fuel passes through the screen of the fuel filter, electrons are stripped from the fuel and collect as static electricity on the housing and/or end caps of the fuel filter. The built-up static electricity on the housing can arc and discharge with neighboring conductive components, thereby causing small amounts of damage to the fuel filter or neighboring components.

SUMMARY

In one aspect of the disclosure, an end cap for a fuel filter includes a metal body with a first surface opposite a second surface. A hole extends through the first surface and the second surface of the body. A metal spring is connected to the first surface of the metal body and extends at least partially over the hole.

In another aspect of the disclosure, a fuel filter includes an end cap and a filter screen. The end cap includes a metal body with a first surface opposite a second surface. A hole extends through the first surface and the second surface of the body. The end cap further includes a metal spring connected to the first surface of the metal body, and the metal spring extends at least partially over the hole. The filter screen is connected to the second surface of the metal body.

In another aspect of the disclosure, an end cap for a fuel filter includes a metal body with a first surface opposite a second surface. A hole extends through the first surface and the second surface of the body. An elastic metal element includes a first end and a second end. The first end is connected to the first surface of the metal body, and a portion of the elastic metal element extends partially over the hole.

Persons of ordinary skill in the art will recognize that other aspects and embodiments of the present invention are possible in view of the entirety of the present disclosure, including the accompanying figures.

Figure 1:
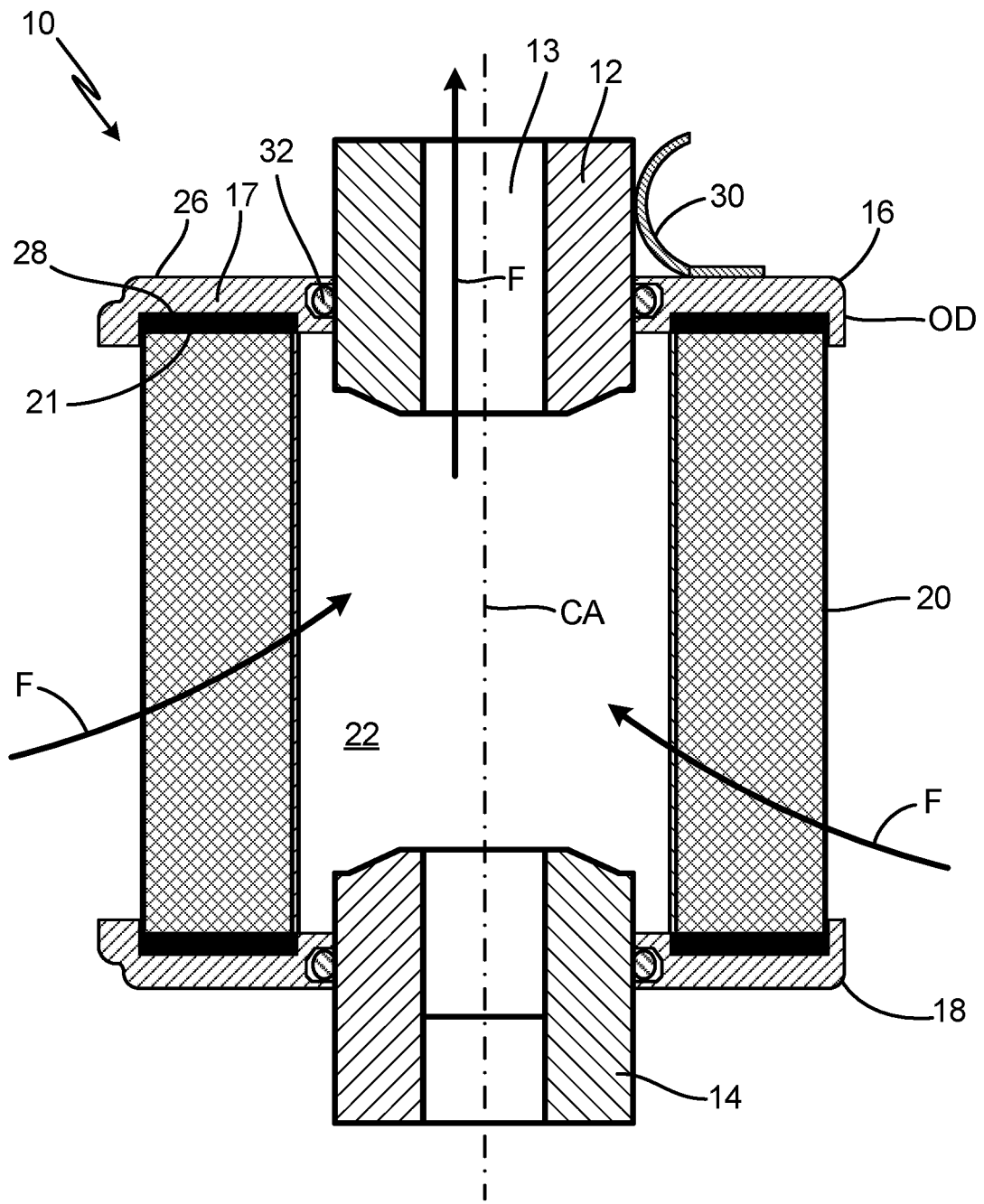
FIG. 1 is a cross-sectional view of a fuel filter connected to a first mounting nub and a second mounting nub.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a metal spring on an end cap of a fuel filter. A metal mounting nub extends through the end cap and connects the fuel filter to an engine. The metal spring presses against the mounting nub and electrically grounds the end cap of the fuel filter to the mounting nub. Because the metal spring electrically grounds the end cap to the mounting nub, static electricity is unable to build up in the fuel filter. The metal spring of the fuel filter end cap is described below with reference to the figures.

Figure 2:
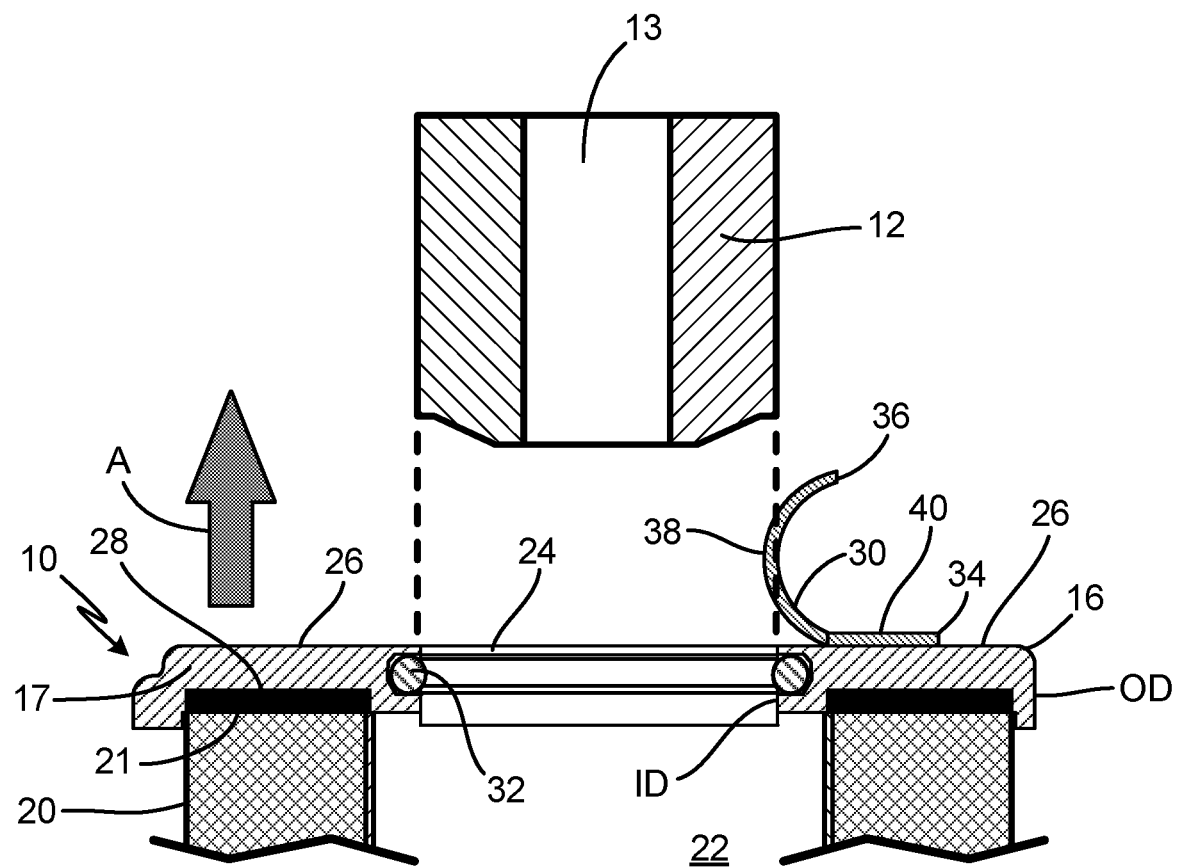
FIG. 2 is a cross-sectional view of a first end cap of the fuel filter being mounted onto the first mounting nub.

FIGS. 1 and 2 will be discussed concurrently. FIG. 1 is a cross-sectional view of fuel filter 10 connected to first mounting nub 12 and a second mounting nub 14. FIG. 2 is a cross-sectional view of first end cap 16 of fuel filter 10 being mounted onto first mounting nub 12. As shown in FIGS. 1 and 2, first mounting nub includes outlet 13. Fuel filter 10 includes first end cap 16, second end cap 18, screen 20, interior passage 22, and center axis CA. First end cap 16 includes hole 24, first surface 26, second surface 28, inner diameter ID, outer diameter OD, metal spring 30, and O-ring 32. Metal spring 30 includes first end 34, second end 36, hook 38, and straight portion 40. Fuel flow F through fuel filter 10 and first mounting nub 12 is also shown in FIG. 1.

Screen 20 of fuel filter 10 is connected to first end cap 16, and second end cap 18 is connected to screen 20 opposite first end cap 16. Epoxy 21 or a similar adhesive can be used to connect screen 20 to first end cap 16 and second end cap 18. As shown in FIG. 1, screen 20 forms a cylindrical tube that extends axially on center axis CA, with interior passage 22 extending through the center. Screen 20 can be pleated and formed from metal mesh, glass fiber, or any other semi-permeable material suitable for separating particles out of fuel. First end cap 16 is a circular metal body 17 with outer diameter OD that is larger than the outer diameter of screen 20. Metal body 17 of first end cap 16 can be formed from stainless steel or any other metal that is corrosion resistant when exposed to liquid fuel. First end cap 16 can be formed from sheet metal via a stamping process. As shown in FIGS. 1 and 2, first end cap 16 is generally flat with first surface 26 and second surface 28 opposite first surface 26. Screen 20 is connected to second surface 28 and first surface 26 faces away from screen 20. In the embodiment of FIGS. 1 and 2, hole 24 extends through first surface 26 and second surface 28 and is centered on center axis CA. Hole 24 forms inner diameter ID of first end cap 16. A groove is formed on inner diameter ID and O-ring 32 is received in the groove such that O-ring 32 surrounds hole 24. As shown in FIG. 1, second end cap 18 can mirror first end cap 16 and include all of the same features as first end cap 16, except that second end cap 18 does not include metal spring 30.

During use, fuel filter 10 is mounted onto first mounting nub 12 and second mounting nub 14 of an engine (not shown). Both first mounting nub 12 and second mounting nub 14 are formed from steel. First mounting nub 12 extends through hole 24 of first end cap 16, and second mounting nub 14 extends through a hole in second end cap 18. Outlet 13 extends axially through first mounting nub 12. During operation, fuel F flows across screen 20, into interior passage 22, and exits fuel filter 10 through outlet 13 in first mounting nub 12. O-ring 32 provides a fluid seal between first mounting nub 12 and first end cap 16, and an O-ring on second end cap 16 provides a fluid seal between second mounting nub 14 and second end cap 16. As O-ring 32 is formed from non-conductive rubber, O-ring 32 can electrically insulate first end cap 16 from first mounting nub 12. As fuel F flows through screen 20, screen 20 can strip electrons from the fuel. Metal spring 30 is connected to first end cap 16 and physically contacts first mounting nub 12 to electrically ground fuel filter 10 to first mounting nub 12. Thus, metal spring 30 provides a grounding path to prevent static electricity from building up in fuel filter 10 as fuel passes through screen 20.

Figure 3:
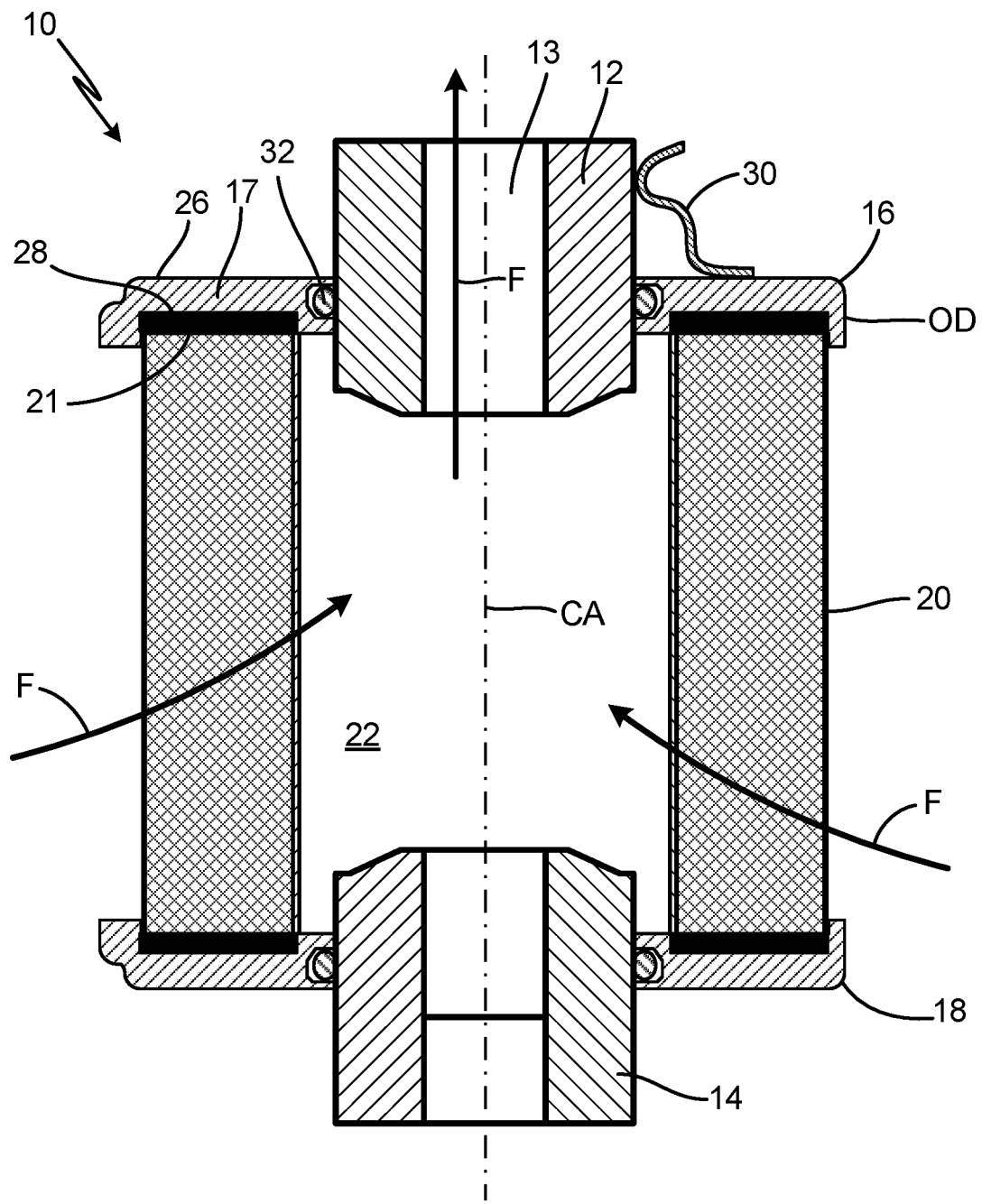
FIG. 3 is a cross-sectional view of another embodiment of the fuel filter connected to a first mounting nub and a second mounting nub.
Figure 4:
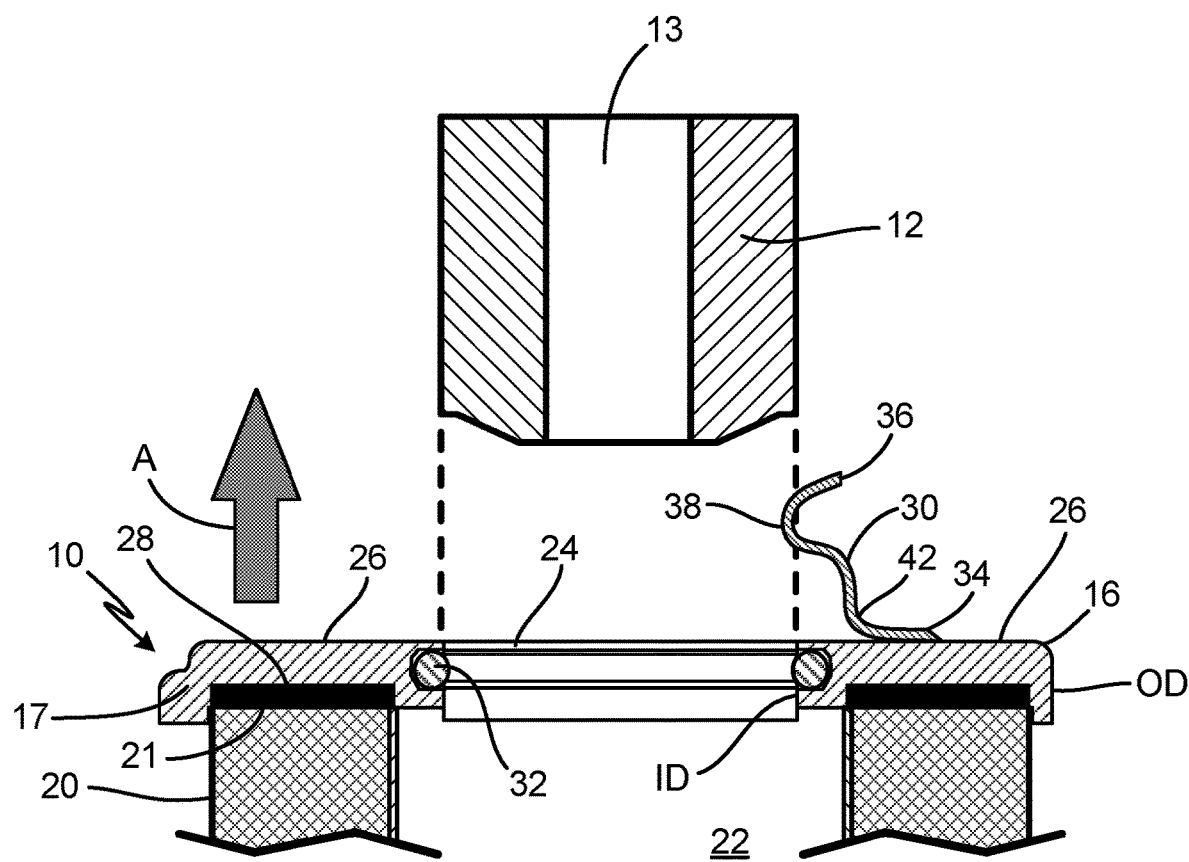
FIG. 4 is a cross-sectional view of another embodiment of the first end cap of the fuel filter being mounted onto the first mounting nub.

Metal spring 30, shown best in FIG. 2, is an elastic metal element. In the embodiment of FIGS. 1 and 2, metal spring 30 is a sheet steel spring that extends from first end 34 to second end 36. Metal spring 30 can be pre-formed and welded to first end cap 16, or metal spring 30 can be formed integral to first end cap 16 in the initial stamping process of first end cap 16. Straight portion 40 is formed in metal spring 30 between first end 34 and a mid-length of metal spring 30. Straight portion 40 is straight and parallel to first surface 26 of first end cap 16. First end 34 and straight portion 40 are connected to first surface 26, preferably by welding. Second end 36 of metal spring 30 is curved axially up and away from first surface 26 to form hook 38 between straight portion 40 and second end 36. Together, hook 38 and straight portion 40 give metal spring 30 a "J" shaped cross-sectional profile. As shown by the dashed lines in FIG. 2, a portion of hook 38 extends over a portion of hole 24. Hook 38 extends over hole 24 so that metal spring 30 contacts first mounting nub 12 and is slightly compressed by first mounting nub 12 when first end cap 16 is installed onto first mounting nub 12. Because metal spring 30 is slightly compressed by first mounting nub 12, hook 38 of metal spring 30 continually presses against and contacts first mounting nub 12, thereby keeping fuel filter 10 continually grounded to first mounting nub 12. FIGS. 3 and 4, discussed below, disclose another embodiment of metal spring 30.

FIGS. 3 and 4 will be discussed concurrently. FIG. 3 is a cross-sectional view of fuel filter 10 with another embodiment of metal spring 30 on first end cap 16. FIG. 4 is a cross-sectional view of first end cap 16 being mounted onto first mounting nub 12.

In the embodiment of FIGS. 3 and 4, metal spring 30 is a sheet steel spring that extends from first end 34 to second end 36. Straight portion 40 is formed in metal spring 30 between first end 34 and a mid-length of metal spring 30. Straight portion 40 is straight and parallel to first surface 26 of first end cap 16. First end 34 and straight portion 40 are connected to first surface 26, preferably by welding. Second end 36 of metal spring 30 is curved to form hook 38 between straight portion 40 and second end 36. Bend 42 is formed in metal spring 30 between hook 38 and straight portion 40. Bend 42 can form an angle in metal spring 30 between 120 degrees and 90 degrees. As shown by the dashed lines in FIG. 4, a portion of hook 38 extends over a portion of hole 24. Similar to the embodiment of FIGS. 1 and 2, hook 38 in the embodiment of FIGS. 3 and 4 extends over hole 24 so that metal spring 30 contacts first mounting nub 12 and is slightly compressed by first mounting nub 12 when first end cap 16 is installed onto first mounting nub 12. Because metal spring 30 is slightly compressed by first mounting nub 12, hook 38 of metal spring 30 continually presses against and contacts first mounting nub 12, thereby keeping fuel filter 10 continually grounded to first mounting nub 12.

In view of the foregoing description, it will be recognized that the present disclosure provides numerous advantages and benefits. For example, the present disclosure provides metal spring 30 on first end cap 16 of fuel filter 10. Metal spring 30 presses against first mounting nub 12 of an engine (not shown) and electrically grounds first end cap 16 of fuel filter 10 to first mounting nub 12. Because metal spring 30 electrically grounds first end cap 16 to first mounting nub 12, static electricity is unable to build up in fuel filter 10. Preventing the build-up of static electricity in fuel filter 10 eliminates the risk of wear that may occur when static electricity discharges from a fuel filter.

The following are non-exclusive descriptions of possible embodiments of the present invention.

In one embodiment, an end cap for a fuel filter includes a metal body with a first surface opposite a second surface. A hole extends through the first surface and the second surface of the body. A metal spring is connected to the first surface of the metal body and extends at least partially over the hole.

The end cap of the preceding paragraph can optionally include, additionally and/or alternatively, any one or more of the following features, configurations and/or additional components:

the metal spring is a sheet steel spring with a straight first end and a second end curved into a hook, wherein the first end is connected to the first surface of the metal body, and a portion of the hook extends over the hole;

the straight first end is welded to the first surface of the metal body;

the metal spring is a sheet metal spring with a first end and a second end curved into a hook, wherein the first end is connected to the first surface of the metal body, wherein sheet metal spring comprises a bend between the hook and the first end, and wherein a portion of the hook extends over the hole;

the bend comprises an angle between 120 degrees and 90 degrees;

the end cap further comprises: an O-ring surrounding the hole; and/or the metal body of the end cap is circular with an outer diameter and center axis, and wherein the hole extends through the metal body on the center axis.

In another embodiment, a fuel filter includes an end cap and a filter screen. The end cap includes a metal body with a first surface opposite a second surface. A hole extends through the first surface and the second surface of the body. The end cap further includes a metal spring connected to the first surface of the metal body, and the metal spring extends at least partially over the hole. The filter screen is connected to the second surface of the metal body.

The fuel filter of the preceding paragraph can optionally include, additionally and/or alternatively, any one or more of the following features, configurations and/or additional components:

a second end cap connected to the filter screen opposite the end cap;

the metal spring is sheet steel with a straight first end and a second end curved into a hook, wherein the first end is connected to the first surface of the metal body, and a portion of the hook extends over the hole;

the straight first end is welded to the first surface of the metal body;

the metal spring is a sheet metal spring with a first end and a second end curved into a hook, wherein the first end is connected to the first surface of the metal body, wherein sheet metal spring comprises a bend between the hook and the first end, and wherein a portion of the hook extends over the hole;

the bend comprises an angle between 120 degrees and 90 degrees; and/or the end cap further comprises: an O-ring surrounding the hole.

In another embodiment, an end cap for a fuel filter includes a metal body with a first surface opposite a second surface. A hole extends through the first surface and the second surface of the body. An elastic metal element includes a first end and a second end. The first end is connected to the first surface of the metal body, and a portion of the elastic metal element extends partially over the hole.

The end cap of the preceding paragraph can optionally include, additionally and/or alternatively, any one or more of the following features, configurations and/or additional components:

the elastic metal element is a sheet metal spring with a first end and a second end curved into a hook, wherein the first end is connected to the first surface of the metal body, and a portion of the hook extends over the hole;

the first end is welded to the first surface of the metal body;

the sheet metal spring comprises a bend between the hook and the first end;

the bend comprises an angle between 120 degrees and 90 degrees; and/or the end cap further comprises: an O-ring surrounding the hole.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, while FIGS. 1-4 disclose metal spring 30 being connected to first end cap 16, metal spring 30 can be connected to second end cap 16 and physically contacting second mounting nub 14. Therefore, it is intended that the invention not be limited to the particular embodiment(s) disclosed, but that the invention will include all embodiments falling within the scope of the appended claims.

The invention claimed is:

1. An end cap for a fuel filter, wherein the end cap comprises:
    a metal body with a first surface opposite a second surface;
    a fuel outlet extending through the first surface and the second surface of the body; and
    a metal spring connected to the first surface of the metal body, wherein the metal spring extends at least partially over the fuel outlet when viewed in a direction parallel to a central longitudinal axis of the fuel outlet.

2. The end cap of claim 1, wherein the metal spring is a sheet steel spring with a straight first end and a second end curved into a hook, wherein the first end is connected to the first surface of the metal body, and a portion of the hook extends over the fuel outlet when viewed in a direction parallel to a central longitudinal axis of the fuel outlet.

3. The end cap of claim 2, wherein the straight first end is welded to the first surface of the metal body.

4. The end cap of claim 1, wherein the metal spring is a sheet metal spring with a first end and a second end curved into a hook, wherein the first end is connected to the first surface of the metal body, wherein the sheet metal spring comprises a bend between the hook and the first end, and wherein a portion of the hook extends over the fuel outlet when viewed in a direction parallel to a central longitudinal axis of the fuel outlet.

5. The end cap of claim 4, wherein the bend comprises an angle between 120 degrees and 90 degrees.

6. The end cap of claim 1, wherein the end cap further comprises:
    an O-ring surrounding the the fuel outlet.

7. The end cap of claim 1, wherein the metal body of the end cap is circular with an outer diameter and center axis, and wherein the fuel inlet extends through the metal body on the center axis.

8. A fuel filter comprising:
    an end cap, wherein the end cap comprises:
        a metal body with a first surface opposite a second surface;
        a hole extending through the first surface and the second surface of the body; and
        a metal spring connected to the first surface of the metal body, wherein the metal spring extends at least partially over the hole when viewed in a direction parallel to a central longitudinal axis of the hole; and
    a filter screen connected to the second surface of the metal body.

9. The fuel filter of claim 8 further comprising:
    a second end cap connected to the filter screen opposite the end cap.

10. The fuel filter of claim 8, wherein the metal spring is sheet steel with a straight first end and a second end curved into a hook, wherein the first end is connected to the first surface of the metal body, and a portion of the hook extends over the hole when viewed in a direction parallel to a central longitudinal axis of the hole.

11. The fuel filter of claim 10, wherein the straight first end is welded to the first surface of the metal body.

12. The fuel filter of claim 8, wherein the metal spring is a sheet metal spring with a first end and a second end curved into a hook, wherein the first end is connected to the first surface of the metal body, wherein the sheet metal spring comprises a bend between the hook and the first end, and wherein a portion of the hook extends over the hole when viewed in a direction parallel to a central longitudinal axis of the hole.

13. The fuel filter of claim 12, wherein the bend comprises an angle between 120 degrees and 90 degrees.

14. The fuel filter of claim 8, wherein the end cap further comprises:
    an O-ring surrounding the hole.

15. An end cap for a fuel filter, wherein the end cap comprises:
    a metal body with a first surface opposite a second surface;
    a fuel inlet extending through the first surface and the second surface of the body; and
    an elastic metal element comprising a first end and a second end, wherein the first end is connected to the first surface of the metal body, and wherein a portion of the elastic metal element extends partially over the fuel inlet when viewed in a direction parallel to a central longitudinal axis of the fuel inlet.

16. The end cap of claim 15, wherein the elastic metal element is a sheet metal spring with the first end and the second end curved into a hook, wherein the first end is connected to the first surface of the metal body, and a portion of the hook extends over the fuel inlet when viewed in a direction parallel to a central longitudinal axis of the fuel inlet.

17. The end cap of claim 16, wherein the first end is welded to the first surface of the metal body.

18. The end cap of claim 17, wherein the sheet metal spring comprises a bend between the hook and the first end.

19. The end cap of claim 18, wherein the bend comprises an angle between 120 degrees and 90 degrees.

20. The end cap of claim 15, wherein the end cap further comprises:

an O-ring surrounding the fuel inlet.

* * * * *